United States Patent
Cao

(10) Patent No.: US 10,193,447 B2
(45) Date of Patent: Jan. 29, 2019

(54) DC TOPOLOGY CIRCUIT WORKABLE WITH VARIOUS LOADS THROUGH INCLUSION OF SUBTRACTOR

(71) Applicant: Shenzhen China Star Optoelectronics Technology Co., Ltd., Shenzhen (CN)

(72) Inventor: Dan Cao, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/551,280

(22) PCT Filed: May 19, 2017

(86) PCT No.: PCT/CN2017/085170
§ 371 (c)(1),
(2) Date: Aug. 15, 2017

(87) PCT Pub. No.: WO2018/196062
PCT Pub. Date: Nov. 1, 2018

(65) Prior Publication Data
US 2018/0316266 A1    Nov. 1, 2018

(30) Foreign Application Priority Data
Apr. 27, 2017   (CN) .......................... 2017 1 0288541

(51) Int. Cl.
*H02M 3/158*     (2006.01)

(52) U.S. Cl.
CPC ................... *H02M 3/158* (2013.01)

(58) Field of Classification Search
CPC .... H02M 3/156–3/158; H02M 3/1584; H02M 3/1588
USPC .......................................... 323/217, 271–285
See application file for complete search history.

(56) References Cited

U.S. PATENT DOCUMENTS

| | | | |
|---|---|---|---|
| 2004/0095114 A1* | 5/2004 | Kernahan | H02M 3/157 323/282 |
| 2011/0031934 A1* | 2/2011 | Pagano | H02M 1/15 320/145 |
| 2015/0205314 A1* | 7/2015 | Hayashi | G05F 1/56 323/217 |

FOREIGN PATENT DOCUMENTS

| | | |
|---|---|---|
| CN | 102336149 A | 2/2012 |
| CN | 104467427 A | 3/2015 |
| JP | 2005198411 A | 7/2005 |

* cited by examiner

*Primary Examiner* — Yemane Mehari
(74) *Attorney, Agent, or Firm* — Leong C. Lei

(57) ABSTRACT

The present invention provides a DC topology circuit, which provides a subtractor in the control chip and a control module which is electrically connected with the output terminal of the subtractor. The two input terminals of the subtractor are respectively inputted with the input voltage and the load-rated voltage, and the input voltage and the load-rated voltage are subtracted by the subtractor. The control module controls the conduction or not of the plurality of field effect transistors according to the operation result, so that the DC topology circuit enters the different working mode, when the load uses the same connection port and communication protocol, the DC topology circuit can supply different loads with different rated voltages, and increase the application range of the DC topology circuit.

13 Claims, 2 Drawing Sheets

DC TOPOLOGY CIRCUIT WORKABLE WITH VARIOUS LOADS THROUGH INCLUSION OF SUBTRACTOR

BACKGROUND OF THE INVENTION

Field of Invention

The present invention relates to the field of integrated circuits, and more particularly to a Direct Current (DC) topology circuit

Description of Prior Art

Direct Current to Direct Current (DC-DC) converter is a conversion circuit of modulating electricity for conversing a fixed DC voltage into an adjustable DC voltage, with ting method, this technology is widely used in a variety of switching power supply, DC gorvernor, Fuel cells, solar power supply and distributed power systems.

As shown in FIG. 1, there is a conventional DC topology circuit, which includes a buck IC 111, a first capacitor C101, a second capacitor C102, a third capacitor C103, a fourth capacitor C104, a fifth capacitor C105, a sixth capacitor C106, a first inductor L101, a first resistor R101, a second resistor R102, and a third resistor R103; a boost terminal BS of the buck IC 111 is electrically connected to one terminal of the first capacitor C101, a ground terminal GND of the buck IC 111 is grounded, an output feedback terminal FB of the buck IC 111 is electrically connected with a third node C, an inductor input terminal LX of the buck IC 111 is electrically connected with a first node A, an input terminal IN of the buck IC 111 is connected with a power supply voltage VCC, and a control terminal EN of the buck IC 111 is electrically connected with a second node B; one other terminal of the first capacitor C101 is electrically connected with the first node A; one terminal of the first inductor L101 is electrically connected with the first node A and one other terminal of the first inductor L101 outputs an output voltage Vcore; one terminal of the second capacitor C102 is electrically connected with the second node B and one other terminal of the second capacitor C102 is grounded; one terminal of the third capacitor C103 is connected with the power supply voltage VCC and the one other terminal of the third capacitor C103 is grounded; one terminal of the fourth capacitor C104 is electrically connected to the other terminal of the first inductor L101 and one other terminal of the fourth capacitor C104 is electrically connected to the third node C; one terminal of the fifth capacitor C105 is electrically connected with the other terminal of the first inductor L101 and one other terminal of the fifth capacitor C105 is grounded; one terminal of the sixth capacitor C106 is electrically connected with the other terminal of the first inductor L101 and one other terminal of the sixth capacitor C106 is grounded; one terminal of the first resistor R101 is electrically connected with the power supply voltage VCC first resistor R101 is electrically connected with the second node B; one terminal of the second resistor R102 is connected with the other terminal of the first inductor L101 and the other terminal of the second resistor R102 is electrically connected with the third node C; one terminal of the third resistor R103 is electrically connected with the third node C and one other terminal of the third resistor R103 is grounded. The DC topology circuit only has a buck function, and can only adapt to one output load. When the output load is not the same, the DC topology circuit cannot be used. Presently, the different output load uses the same interface and communication protocol, if a power supply for one load is connected with another load, the product may be damaged due to the difference in voltage and current.

SUMMARY OF THE INVENTION

The objective of the present invention is to provide a DC topology circuit capable of normally working under different loads, when the same connection port and communication protocol are used, to increase the application range of the DC topology circuit.

In order to achieve the objective, the present invention provides a DC topology circuit, which comprises a control chip, a first field effect transistor, a second field effect transistor, a third field effect transistor, a fourth field effect transistor, a first inductor, a first capacitor, and a second capacitor.

The control chip comprises a control module and a subtractor. A first input terminal of the subtractor is inputted with an input voltage, a second input terminal of the subtractor is connected with a load-rated voltage and an output terminal of the subtractor is electrically connected with the control module.

A gate electrode of the first field effect transistor is inputted with a first control signal, a drain electrode of the first field effect transistor is connected with the input voltage, and a source electrode of the first field effect transistor is electrically connected to one terminal of the first inductor. A gate electrode of the second field effect transistor is inputted with a second control signal, a drain electrode of the second field effect transistor is connected the terminal of the first inductor, and a source electrode of the second field effect transistor is grounded. A gate electrode of the third field effect transistor is inputted with a third control signal, a drain electrode of the third field effect transistor is electrically connected to one other terminal of the first inductor, and the source electrode of the third field effect transistor is grounded. A gate electrode of the fourth field effect transistor is inputted with a fourth control signal, the drain electrode of the fourth field effect transistor outputs a output voltage, and the source electrode of the fourth field effect transistor is electrically connected with the other terminal of the first inductor. One terminal of the first capacitor is electrically connected with the terminal of the first inductor and one other terminal of the first capacitor is electrically connected to a first bootstrap pin of the control chip. One terminal of the second capacitor is electrically connected to the other terminal of the first inductor and one other terminal of the second capacitor is electrically connected with a second bootstrap pin of the control chip.

The first control signal, the second control signal, the third control signal, and the fourth control signal are all provided by the control module.

The subtractor subtracts the input voltage and the load-rated voltage and outputs an operation result to the control module; the control module adjusts the first control signal, the second control signal, the third control signal, and the fourth control signal, to correspondingly control on/off of the first field effect transistor, the second field effect transistor, the third field effect transistor, and the fourth field effect transistor.

When the input voltage is greater than the load-rated voltage, the subtractor outputs an operation result of a difference between the input voltage and the load-rated voltage is greater than zero to the control module, the control module outputs the fourth control signal to turn on the fourth field effect transistor, outputs the third control signal to turn off the third field effect transistor, and outputs the second control signal and the first control signal to alternately turn on the first field effect transistor and the second field effect transistor, according to the operation result of a difference between the input voltage and the load-rated voltage is greater than zero.

When the input voltage is less than the load-rated voltage, the subtractor outputs an operation result of a difference between the input voltage and the load-rated voltage is less than zero to the control module, the control module outputs the first control signal to turn on the first field effect transistor, outputs the second control signal to turn off the second field effect transistor, and outputs the third control signal and the fourth control signal to alternately turn on the third field effect transistor and the fourth field effect transistor, according to the operation result of a difference between the input voltage and the load-rated voltage is less than zero.

When the input voltage is equal to the load-rated voltage, the subtractor outputs an operation result of a difference between the input voltage and the load-rated voltage is equal to zero to the control module, the control module outputs the first control signal to turn on the first field effect transistor, outputs the second control signal to turn off the second field effect transistor, outputs the third control signal to turn off the third field effect transistor, and outputs the fourth control signal to turn on the fourth field effect transistor, according to the operation result of a difference between the input voltage and the load-rated voltage is equal to zero.

When the input voltage is greater than the load-rated voltage, a ratio of a conduction time of the first field effect transistor to a sum conduction time of the first field effect transistor and the second field effect transistor is the same as the ratio of the load-rated voltage to the input voltage.

When the input voltage is less than the load-rated voltage, a ratio of a conduction time of the third field effect transistor to a sum conduction time of the third field effect transistor and the fourth field effect transistor is the same as the ratio of a difference between the load-rated voltage and the input voltage to the input voltage.

The first field effect transistor, the second field effect transistor, the third field effect transistor and the fourth field effect transistor are both N type field effect transistors.

When the input voltage is greater than the load rated voltage, the fourth control signal is at a high potential and the third control signal is at a low potential.

When the input voltage is less than the load rated voltage, the first control signal is at a high potential and the second control signal is at a low potential.

When the input voltage is equal to the load rated voltage, the first control signal and the fourth control signal are at high potentials and the second control signal and the third control signal are at low potentials.

In order to achieve the objective, the present invention further provides a DC topology circuit, which comprises a control chip, a first field effect transistor, a second field effect transistor, a third field effect transistor, a fourth field effect transistor, a first inductor, a first capacitor, and a second capacitor.

The control chip comprises a control module and a subtractor. A first input terminal of the subtractor is inputted with an input voltage, a second input terminal of the subtractor is connected with a load-rated voltage and an output terminal of the subtractor is electrically connected with the control module.

A gate electrode of the first field effect transistor is inputted with a first control signal, a drain electrode of the first field effect transistor is connected with the input voltage, and a source electrode of the first field effect transistor is electrically connected to one terminal of the first inductor. A gate electrode of the second field effect transistor is inputted with a second control signal, a drain electrode of the second field effect transistor is connected the terminal of the first inductor, and a source electrode of the second field effect transistor is grounded. A gate electrode of the third field effect transistor is inputted with a third control signal, a drain electrode of the third field effect transistor is electrically connected to one other terminal of the first inductor, and the source electrode of the third field effect transistor is grounded. A gate electrode of the fourth field effect transistor is inputted with a fourth control signal, the drain electrode of the fourth field effect transistor outputs a output voltage, and the source electrode of the fourth field effect transistor is electrically connected with the other terminal of the first inductor. One terminal of the first capacitor is electrically connected with the terminal of the first inductor and one other terminal of the first capacitor is electrically connected to a first bootstrap pin of the control chip. One terminal of the second capacitor is electrically connected to the other terminal of the first inductor and one other terminal of the second capacitor is electrically connected with a second bootstrap pin of the control chip.

The first control signal, the second control signal, the third control signal, and the fourth control signal are all provided by the control module.

The subtractor subtracts the input voltage and the load-rated voltage and outputs an operation result to the control module; the control module adjusts the first control signal, the second control signal, the third control signal, and the fourth control signal, to correspondingly control on/off of the first field effect transistor, the second field effect transistor, the third field effect transistor, and the fourth field effect transistor.

When the input voltage is greater than the load-rated voltage, the subtractor outputs an operation result of a difference between the input voltage and the load-rated voltage is greater than zero to the control module, the control module outputs the fourth control signal to turn on the fourth field effect transistor, outputs the third control signal to turn off the third field effect transistor, and outputs the second control signal and the first control signal to alternately turn on the first field effect transistor and the second field effect transistor, according to the operation result of a difference between the input voltage and the load-rated voltage is greater than zero.

When the input voltage is less than the load-rated voltage, the subtractor outputs an operation result of a difference between the input voltage and the load-rated voltage is less than zero to the control module, the control module outputs the first control signal to turn on the first field effect transistor, outputs the second control signal to turn off the second field effect transistor, and outputs the third control signal and the fourth control signal to alternately turn on the third field effect transistor and the fourth field effect transistor, according to the operation result of a difference between the input voltage and the load-rated voltage is less than zero.

When the input voltage is equal to the load-rated voltage, the subtractor outputs an operation result of a difference between the input voltage and the load-rated voltage is equal to zero to the control module, the control module outputs the first control signal to turn on the first field effect transistor, outputs the second control signal to turn off the second field effect transistor, outputs the third control signal to turn off the third field effect transistor, and outputs the fourth control signal to turn on the fourth field effect transistor, according to the operation result of a difference between the input voltage and the load-rated voltage is equal to zero.

When the input voltage is greater than the load-rated voltage, a ratio of a conduction time of the first field effect transistor to a sum conduction time of the first field effect transistor and the second field effect transistor is the same as the ratio of the load-rated voltage to the input voltage.

When the input voltage is less than the load-rated voltage, a ratio of a conduction time of the third field effect transistor to a sum conduction time of the third field effect transistor and the fourth field effect transistor is the same as the ratio of a difference between the load-rated voltage and the input voltage to the input voltage.

The first field effect transistor, the second field effect transistor, the third field effect transistor and the fourth field effect transistor are both N type field effect transistors.

When the input voltage is greater than the load rated voltage, the fourth control signal is at a high potential and the third control signal is at a low potential.

When the input voltage is less than the load rated voltage, the first control signal is at a high potential and the second control signal is at a low potential.

When the input voltage is equal to the load rated voltage, the first control signal and the fourth control signal are at high potentials and the second control signal and the third control signal are at low potentials.

The present invention provides a DC topology circuit, which provides a subtractor in the control chip and a control module which is electrically connected with the output terminal of the subtractor. The two input terminals of the subtractor are respectively inputted with the input voltage and the load-rated voltage, and the input voltage and the load-rated voltage are subtracted by the subtractor. The control module controls the conduction or not of the plurality of field effect transistors according to the operation result, so that the DC topology circuit enters the different working mode, when the load uses the same connection port and communication protocol, the DC topology circuit can supply different loads with different rated voltages, and increase the application range of the DC topology circuit.

BRIEF DESCRIPTION OF THE DRAWINGS

For the purpose of further understanding the features and technical aspects of the present invention, please refer the following detailed description of the present invention with the accompanying drawings, wherein the drawings are provided for reference only and are not intended to limit the present invention.

DETAILED DESCRIPTION OF THE PREFERRED EMBODIMENTS

The technical means and the effects thereof will be described in further detail with reference to the preferred embodiments of the present invention and their accompanying drawings.

Figure 1:
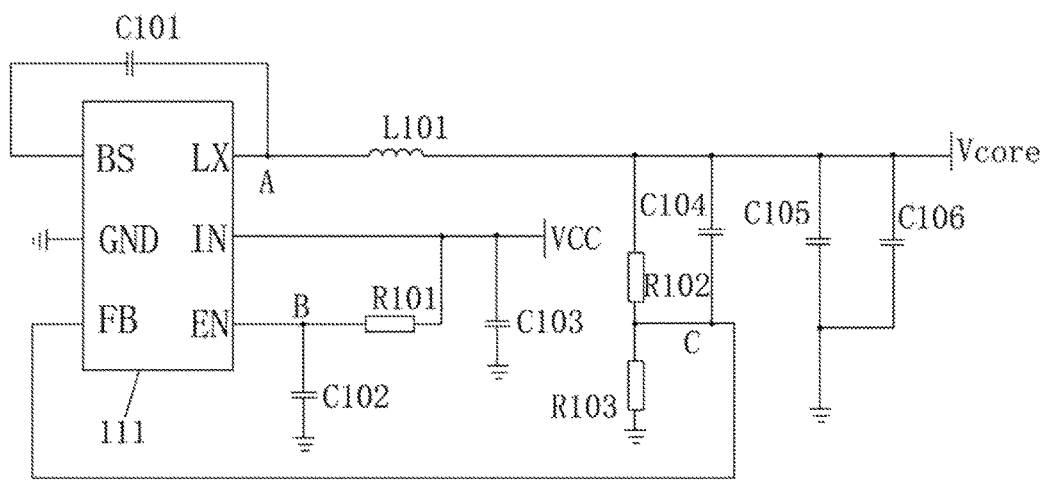
FIG. 1 is an diagram of the conventional DC topology circuit.
Figure 2:
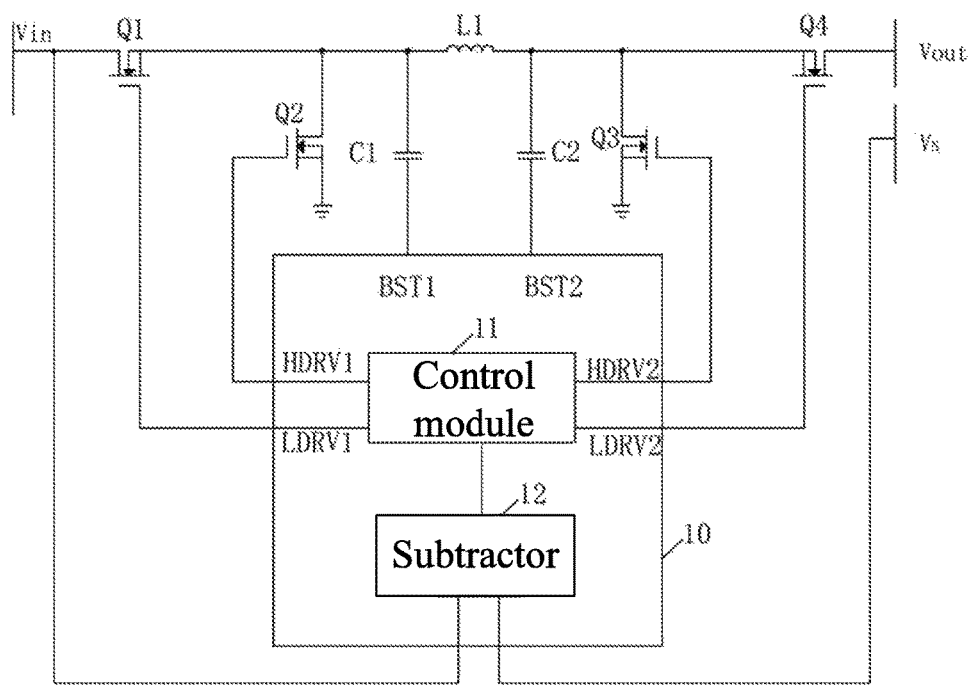
FIG. 2 is an diagram of the DC topology circuit of the present invention.

Please refer to FIG. 2, the present invention provides a DC topology circuit, which comprises a control chip 10, a first field effect transistor Q1, a second field effect transistor Q2, a third field effect transistor Q3, a fourth field effect transistor Q4, a first inductor L1, a first capacitor C1, and a second capacitor C2.

The control chip 10 comprises a control module 11 and a subtractor 12. A first input terminal of the subtractor 12 is inputted with an input voltage Vin, a second input terminal of the subtractor 12 is connected with a load-rated voltage $V_N$ and an output terminal of the subtractor 12 is electrically connected with the control module 11.

A gate electrode of the first field effect transistor Q1 is inputted with a first control signal LDRV1, a drain electrode of the first field effect transistor Q1 is connected with the input voltage Vin, and a source electrode of the first field effect transistor Q1 is electrically connected to one terminal of the first inductor L1. A gate electrode of the second field effect transistor Q2 is inputted with a second control signal HDRV1, a drain electrode of the second field effect transistor Q2 is connected the terminal of the first inductor L1, and a source electrode of the second field effect transistor Q2 is grounded. A gate electrode of the third field effect transistor Q3 is inputted with a third control signal HDRV2, a drain electrode of the third field effect transistor Q3 is electrically connected to one other terminal of the first inductor L1, and the source electrode of the third field effect transistor Q3 is grounded. A gate electrode of the fourth field effect transistor Q4 is inputted with a fourth control signal LDRV2, the drain electrode of the fourth field effect transistor Q4 outputs a output voltage, and the source electrode of the fourth field effect transistor Q4 is electrically connected with the other terminal of the first inductor L1. One terminal of the first capacitor C1 is electrically connected with the terminal of the first inductor L1 and one other terminal of the first capacitor C1 is electrically connected to a first bootstrap pin BST1 of the control chip 10. One terminal of the second capacitor C2 is electrically connected to the other terminal of the first inductor L1 and one other terminal of the second capacitor C2 is electrically connected with a second bootstrap pin BST2 of the control chip 10.

The first control signal LDRV1, the second control signal HDRV1, the third control signal HDRV2, and the fourth control signal LDRV2 are all provided by the control module 11.

The subtractor 12 subtracts the input voltage Vin and the load-rated voltage $V_N$ and outputs an operation result to the control module 11; the control module 11 adjusts the first control signal LDRV1, the second control signal HDRV1, the third control signal HDRV2, and the fourth control signal LDRV2, to correspondingly control on/off of the first field effect transistor Q1, the second field effect transistor Q2, the third field effect transistor Q3, and the fourth field effect transistor Q4.

Specifically, when the input voltage Vin is greater than the load-rated voltage $V_N$, the subtractor 12 outputs an operation result of a difference between the input voltage Vin and the load-rated voltage $V_N$ is greater than zero to the control module 11, the control module 11 outputs the fourth control signal LDRV2 to turn on the fourth field effect transistor Q4, outputs the third control signal HDRV2 to turn off the third field effect transistor Q3, and outputs the second control signal HDRV1 and the first control signal LDRV1 to alternately turn on the first field effect transistor Q1 and the second field effect transistor Q2, according to the operation result of a difference between the input voltage Vin and the load-rated voltage $V_N$ is greater than zero. At this moment, the DC topology circuit enters a buck mode, the first field effect transistor Q1, the second field effect transistor Q2, and the first inductor L1 constitute a buck topology, and the other terminal of the first inductor L1 directly outputs the output voltage Vout. In this stage, when the first field transistor Q1 is turned on and the second field effect transistor Q2 is turned off, the input voltage Vin charges for the first inductor L1, and when the first field effect transistor Q1 is turned off, the second field effect transistor Q2 is turned on, one terminal of the first inductor L1 is grounded for discharging, to sum up, the output voltage Vout output from the other terminal of the first inductor L1 is smaller than the input voltage Vin, to achieve the purpose of buck output.

Preferably, when the input voltage Vin is greater than the load-rated voltage $V_N$, the duty cycles of the first control signal LDRV1 and the second control signal HDRV1 outputted from the control module 11 are controlled so that a ratio of a conduction time of the first field effect transistor Q1 to a sum conduction time sum of the first field effect transistor Q1 and the second field effect transistor Q2 is the same as the ratio of the load-rated voltage $V_N$ to the input voltage Vin, and the output voltage Vout outputted from the other terminal of the first inductor L1 and the load-rated voltage $V_N$ is equal, so that the DC topology circuit exactly matches the load with the rated-voltage $V_N$.

Specifically, when the input voltage Vin is less than the load-rated voltage $V_N$, the subtractor 12 outputs an operation result of a difference between the input voltage Vin and the load-rated voltage $V_N$ is less than zero to the control module 11, the control module 11 outputs the first control signal LDRV1 to turn on the first field effect transistor Q1, outputs the second control signal HDRV1 to turn off the second field effect transistor Q2, and outputs the third control signal HDRV2 and the fourth control signal LDRV2 to alternately turn on the third field effect transistor Q3 and the fourth field effect transistor Q4, according to the operation result of a difference between the input voltage Vin and the load-rated voltage $V_N$ is less than zero. At this moment, the DC topology circuit enters a boost mode, the third field effect transistor Q3, the fourth field effect transistor Q4, and the first inductor L1 constitute a boost topology, and the other terminal of the first inductor L1 directly inputs with the input voltage Vin. In this stage, when the third field transistor Q3 is turned on and the fourth field effect transistor Q4 is turned off, the input voltage Vin charges for the first inductor L1, and when the third field effect transistor Q3 is turned off, the fourth field effect transistor Q4 is turned on, the first inductor L1 and the input voltage Vin both output the output voltage Vout, to sum up, the output voltage Vout is greater than the input voltage Vin, to achieve the purpose of boost output.

Preferably, when the input voltage Vin is less than the load-rated voltage $V_N$, the duty cycles of the first control signal LDRV1 and the second control signal HDRV1 outputted from the control module 11 are controlled so that a ratio of a conduction time of the third field effect transistor Q3 to a sum conduction time of the third field effect transistor Q3 and the fourth field effect transistor Q4 is the same as the ratio of a difference between the load-rated voltage $V_N$ and the input voltage Vin to the input voltage Vin, and the output voltage Vout and the load-rated voltage $V_N$ is equal, so that the DC topology circuit exactly matches the load with the rated-voltage $V_N$.

Specifically, when the input voltage Vin is equal to the load-rated voltage $V_N$, the subtractor 12 outputs an operation result of a difference between the input voltage Vin and the load-rated voltage $V_N$ is equal to zero to the control module 11, the control module 11 outputs the first control signal LDRV1 to turn on the first field effect transistor Q1, outputs the second control signal HDRV1 to turn off the second field effect transistor Q2, outputs the third control signal HDRV2 to turn off the third field effect transistor Q3, and outputs the fourth control signal LDRV2 to turn on the fourth field effect transistor Q4, according to the operation result of a difference between the input voltage Vin and the load-rated voltage $V_N$ is equal to zero. At this moment, the output voltage Vout output from the other terminal of the first inductor L1 directly the output voltage Vout the same as the load-rated voltage $V_N$, so that the DC topology circuit exactly matches the load with the rated-voltage $V_N$.

Specifically, the first field effect transistor Q1, the second field effect transistor Q2, the third field effect transistor Q3 and the fourth field effect transistor Q4 are both N type field effect transistors.

Furthermore, when the input voltage Vin is greater than the load rated voltage, the fourth control signal LDRV2 is at a high potential and the third control signal HDRV2 is at a low potential.

When the input voltage Vin is less than the load rated voltage, the first control signal LDRV1 is at a high potential and the second control signal HDRV1 is at a low potential.

When the input voltage Vin is equal to the load rated voltage, the first control signal LDRV1 and the fourth control signal LDRV2 are at high potentials and the second control signal HDRV1 and the third control signal HDRV2 are at low potentials.

As mentioned above, the present invention provides a DC topology circuit, which provides a subtractor in the control chip and a control module which is electrically connected with the output terminal of the subtractor. The two input terminals of the subtractor are respectively inputted with the input voltage and the load-rated voltage, and the input voltage and the load-rated voltage are subtracted by the subtractor. The control module controls the conduction or not of the plurality of field effect transistors according to the operation result, so that the DC topology circuit enters the different working mode, when the load uses the same connection port and communication protocol, the DC topology circuit can supply different loads with different rated voltages, and increase the application range of the DC topology circuit.

As mentioned above, those of ordinary skill in the art, without departing from the spirit and scope of the present disclosure, can make various kinds of modifications and variations to the present disclosure. Therefore, all such modifications and variations are intended to be included in the protection scope of the appended claims of the present invention.

What is claimed is:

1. A DC topology circuit, comprising a control chip, a first field effect transistor, a second field effect transistor, a third field effect transistor, a fourth field effect transistor, a first inductor, a first capacitor, and a second capacitor;
   the control chip comprises a control module and a subtractor; a first input terminal of the subtractor is inputted with an input voltage, a second input terminal of the subtractor is connected with a load-rated voltage and an output terminal of the subtractor is electrically connected with the control module;
   a gate electrode of the first field effect transistor is inputted with a first control signal, a drain electrode of the first field effect transistor is connected with the input voltage, and a source electrode of the first field effect transistor is electrically connected to one terminal of the first inductor; a gate electrode of the second field effect transistor is inputted with a second control signal, a drain electrode of the second field effect transistor is connected the terminal of the first inductor, and a source electrode of the second field effect transistor is grounded; a gate electrode of the third field effect transistor is inputted with a third control signal, a drain electrode of the third field effect transistor is electrically connected to one other terminal of the first inductor, and the source electrode of the third field effect transistor is grounded; a gate electrode of the fourth field effect transistor is inputted with a fourth control signal, the drain electrode of the fourth field effect transistor outputs a output voltage, and the source electrode of the fourth field effect transistor is electrically connected with the other terminal of the first inductor; one terminal of the first capacitor is electrically connected with the terminal of the first inductor and one other terminal of the first capacitor is electrically connected to a first bootstrap pin of the control chip; one terminal of the second capacitor is electrically connected to the other terminal of the first inductor and one other terminal of the second capacitor is electrically connected with a second bootstrap pin of the control chip;

the first control signal, the second control signal, the third control signal, and the fourth control signal are all provided by the control module;

wherein the subtractor subtracts the input voltage and the load-rated voltage and outputs an operation result to the control module; the control module adjusts the first control signal, the second control signal, the third control signal, and the fourth control signal, to correspondingly control on/off of the first field effect transistor, the second field effect transistor, the third field effect transistor, and the fourth field effect transistor.

2. The DC topology circuit according to claim 1, wherein when the input voltage is greater than the load-rated voltage, the subtractor outputs an operation result of a difference between the input voltage and the load-rated voltage is greater than zero to the control module, the control module outputs the fourth control signal to turn on the fourth field effect transistor, outputs the third control signal to turn off the third field effect transistor, and outputs the second control signal and the first control signal to alternately turn on the first field effect transistor and the second field effect transistor, according to the operation result of a difference between the input voltage and the load-rated voltage is greater than zero;

when the input voltage is less than the load-rated voltage, the subtractor outputs an operation result of a difference between the input voltage and the load-rated voltage is less than zero to the control module, the control module outputs the first control signal to turn on the first field effect transistor, outputs the second control signal to turn off the second field effect transistor, and outputs the third control signal and the fourth control signal to alternately turn on the third field effect transistor and the fourth field effect transistor, according to the operation result of a difference between the input voltage and the load-rated voltage is less than zero;

when the input voltage is equal to the load-rated voltage, the subtractor outputs an operation result of a difference between the input voltage and the load-rated voltage is equal to zero to the control module, the control module outputs the first control signal to turn on the first field effect transistor, outputs the second control signal to turn off the second field effect transistor, outputs the third control signal to turn off the third field effect transistor, and outputs the fourth control signal to turn on the fourth field effect transistor, according to the operation result of a difference between the input voltage and the load-rated voltage is equal to zero.

3. The DC topology circuit according to claim 2, wherein when the input voltage is greater than the load-rated voltage, a ratio of a conduction time of the first field effect transistor to a sum conduction time of the first field effect transistor and the second field effect transistor is the same as the ratio of the load-rated voltage to the input voltage.

4. The DC topology circuit according to claim 2, wherein when the input voltage is less than the load-rated voltage, a ratio of a conduction time of the third field effect transistor to a sum conduction time of the third field effect transistor and the fourth field effect transistor is the same as the ratio of a difference between the load-rated voltage and the input voltage to the input voltage.

5. The DC topology circuit according to claim 2, wherein the first field effect transistor, the second field effect transistor, the third field effect transistor and the fourth field effect transistor are both N type field effect transistors.

6. The DC topology circuit according to claim 5, wherein when the input voltage is greater than the load rated voltage, the fourth control signal is at a high potential and the third control signal is at a low potential.

7. The DC topology circuit according to claim 5, wherein when the input voltage is less than the load rated voltage, the first control signal is at a high potential and the second control signal is at a low potential.

8. The DC topology circuit according to claim 5, wherein when the input voltage is equal to the load rated voltage, the first control signal and the fourth control signal are at high potentials and the second control signal and the third control signal are at low potentials.

9. A DC topology circuit, comprising a control chip, a first field effect transistor, a second field effect transistor, a third field effect transistor, a fourth field effect transistor, a first inductor, a first capacitor, and a second capacitor;

the control chip comprises a control module and a subtractor; a first input terminal of the subtractor is inputted with an input voltage, a second input terminal of the subtractor is connected with a load-rated voltage and an output terminal of the subtractor is electrically connected with the control module;

a gate electrode of the first field effect transistor is inputted with a first control signal, a drain electrode of the first field effect transistor is connected with the input voltage, and a source electrode of the first field effect transistor is electrically connected to one terminal of the first inductor; a gate electrode of the second field effect transistor is inputted with a second control signal, a drain electrode of the second field effect transistor is connected the terminal of the first inductor, and a source electrode of the second field effect transistor is grounded; a gate electrode of the third field effect transistor is inputted with a third control signal, a drain electrode of the third field effect transistor is electrically connected to one other terminal of the first inductor, and the source electrode of the third field effect transistor is grounded; a gate electrode of the fourth field effect transistor is inputted with a fourth control signal, the drain electrode of the fourth field effect transistor outputs a output voltage, and the source electrode of the fourth field effect transistor is electrically connected with the other terminal of the first inductor; one terminal of the first capacitor is electrically connected with the terminal of the first inductor and one other terminal of the first capacitor is electrically connected to a first bootstrap pin of the control chip; one terminal of the second capacitor is electrically connected to the other terminal of the first inductor and one other terminal of the second capacitor is electrically connected with a second bootstrap pin of the control chip;

the first control signal, the second control signal, the third control signal, and the fourth control signal are all provided by the control module;

wherein the subtractor subtracts the input voltage and the load-rated voltage and outputs an operation result to the control module; the control module adjusts the first control signal, the second control signal, the third control signal, and the fourth control signal, to correspondingly control on/off of the first field effect transistor, the second field effect transistor, the third field effect transistor, and the fourth field effect transistor;

wherein when the input voltage is greater than the load-rated voltage, the subtractor outputs an operation result of a difference between the input voltage and the load-rated voltage is greater than zero to the control module, the control module outputs the fourth control signal to turn on the fourth field effect transistor, outputs the third control signal to turn off the third field effect transistor, and outputs the second control signal and the first control signal to alternately turn on the first field effect transistor and the second field effect transistor, according to the operation result of a difference between the input voltage and the load-rated voltage is greater than zero;

when the input voltage is less than the load-rated voltage, the subtractor outputs an operation result of a difference between the input voltage and the load-rated voltage is less than zero to the control module, the control module outputs the first control signal to turn on the first field effect transistor, outputs the second control signal to turn off the second field effect transistor, and outputs the third control signal and the fourth control signal to alternately turn on the third field effect transistor and the fourth field effect transistor, according to the operation result of a difference between the input voltage and the load-rated voltage is less than zero;

when the input voltage is equal to the load-rated voltage, the subtractor outputs an operation result of a difference between the input voltage and the load-rated voltage is equal to zero to the control module, the control module outputs the first control signal to turn on the first field effect transistor, outputs the second control signal to turn off the second field effect transistor, outputs the third control signal to turn off the third field effect transistor, and outputs the fourth control signal to turn on the fourth field effect transistor, according to the operation result of a difference between the input voltage and the load-rated voltage is equal to zero;

wherein when the input voltage is greater than the load-rated voltage, a ratio of a conduction time of the first field effect transistor to a sum conduction time of the first field effect transistor and the second field effect transistor is the same as the ratio of the load-rated voltage to the input voltage;

wherein when the input voltage is less than the load-rated voltage, a ratio of a conduction time of the third field effect transistor to a sum conduction time of the third field effect transistor and the fourth field effect transistor is the same as the ratio of a difference between the load-rated voltage and the input voltage to the input voltage.

10. The DC topology circuit according to claim 9, wherein the first field effect transistor, the second field effect transistor, the third field effect transistor and the fourth field effect transistor are both N type field effect transistors.

11. The DC topology circuit according to claim 10, wherein when the input voltage is greater than the load rated voltage, the fourth control signal is at a high potential and the third control signal is at a low potential.

12. The DC topology circuit according to claim 10, wherein when the input voltage is less than the load rated voltage, the first control signal is at a high potential and the second control signal is at a low potential.

13. The DC topology circuit according to claim 10, wherein when the input voltage is equal to the load rated voltage, the first control signal and the fourth control signal are at high potentials and the second control signal and the third control signal are at low potentials.

* * * * *